(12) United States Patent
Sung et al.

(10) Patent No.: US 12,059,115 B2
(45) Date of Patent: Aug. 13, 2024

(54) CLEANER AND METHOD FOR CONTROLLING SAME

(71) Applicant: LG ELECTRONICS INC., Seoul (KR)

(72) Inventors: Chulmo Sung, Seoul (KR); Hyungjin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 827 days.

(21) Appl. No.: 17/054,814

(22) PCT Filed: May 16, 2019

(86) PCT No.: PCT/KR2019/005860
§ 371 (c)(1),
(2) Date: Nov. 12, 2020

(87) PCT Pub. No.: WO2019/221523
PCT Pub. Date: Nov. 21, 2019

(65) Prior Publication Data
US 2021/0361132 A1     Nov. 25, 2021

(30) Foreign Application Priority Data

May 16, 2018   (KR) .................. 10-2018-0056132

(51) Int. Cl.
*A47L 9/28*      (2006.01)
*A47L 9/00*      (2006.01)
(Continued)

(52) U.S. Cl.
CPC ............. *A47L 9/009* (2013.01); *A47L 9/2826* (2013.01); *A47L 9/2852* (2013.01);
(Continued)

(58) Field of Classification Search
CPC ... B25J 19/021; A47L 2201/04; A47L 9/2805; G05D 2201/0215; G05D 1/0246
(Continued)

(56) References Cited

U.S. PATENT DOCUMENTS 9,689,696 B1 *  6/2017   Russell ................ G05D 1/0287
9,785,148 B2 * 10/2017   Yun ........................ G05D 1/027
(Continued)

FOREIGN PATENT DOCUMENTS

CN     207444896 U  *  6/2018  ............. A47L 11/33
CN     207444899 U  *  6/2018  ............. A47L 11/33
(Continued)

OTHER PUBLICATIONS

Rocque, M. J. "3D Map Creation using the Structured Light Technique for Obstacle." Workshop on. 2009. (Year: 2009).*
(Continued)

*Primary Examiner* — Cuong H Nguyen
(74) *Attorney, Agent, or Firm* — Birch, Stewart, Kolasch & Birch, LLP

(57) ABSTRACT

A self-driving cleaner includes a main body and a driving unit for driving in a cleaning area. The cleaner suctions foreign material on the floor in the cleaning area. The cleaner includes a first pattern irradiation unit and a second pattern irradiation unit on the front surface of the main body, the first and second pattern irradiation units radiating light in a preset pattern towards the front lower side and the front upper side of the main body, respectively. The cleaner includes a camera on the front surface of the main body, for capturing, at a preset interval, an image including a first light pattern and a second light pattern formed by the first and the second pattern irradiation units, respectively. The cleaner includes a control unit for determining whether a first obstacle exists at
(Continued)

a location upwardly spaced apart from the floor, using the image captured by the camera.

11 Claims, 11 Drawing Sheets

(51) Int. Cl.
 *G01B 11/02* (2006.01)
 *G05D 1/00* (2006.01)
(52) U.S. Cl.
 CPC ......... *G01B 11/026* (2013.01); *G05D 1/0214* (2013.01); *G05D 1/0223* (2013.01); *G05D 1/0246* (2013.01); *A47L 2201/04* (2013.01)
(58) Field of Classification Search
 USPC .......................................................... 701/23
 See application file for complete search history.

(56) References Cited

U.S. PATENT DOCUMENTS

| | | | |
|---|---|---|---|
| 10,016,896 B2 * | 7/2018 | Sinyavskiy | ............ B25J 9/1697 |
| 10,462,972 B2 * | 11/2019 | Moore | ...................... A01G 7/06 |
| 2015/0168954 A1 | 6/2015 | Hickerson et al. | |
| 2016/0320777 A1 * | 11/2016 | Yun | ...................... G05D 1/0238 |
| 2017/0336796 A1 * | 11/2017 | Jun | ....................... A47L 9/2826 |
| 2017/0336798 A1 * | 11/2017 | Nam | ...................... A47L 9/1666 |

FOREIGN PATENT DOCUMENTS

| | | | | |
|---|---|---|---|---|
| EP | 3 087 894 A1 | 11/2016 | | |
| EP | 3459688 B1 * | 2/2021 | .............. | A47L 11/33 |
| KR | 10-2014-0115891 A | 10/2014 | | |
| KR | 10-2016-0043841 A | 4/2016 | | |
| KR | 10-1649665 B1 | 8/2016 | | |
| KR | 10-2017-0129571 A | 11/2017 | | |
| KR | 20170134280 A * | 12/2017 | ........... | G06F 3/0416 |
| KR | 10-2018-0025724 A | 3/2018 | | |
| KR | 20190134925 A * | 12/2019 | ............... | A47L 9/28 |
| TW | 201808197 A * | 3/2018 | .............. | A47L 11/24 |

OTHER PUBLICATIONS

Rocque, M. J. "3D map creation using the structured light technique for obstacle avoidance." Philips Research Europe (2011): 1-50. . (Year: 2011).*
Rocque, M. J. "3D map creation using the structured light technique for obstacle avoidance." Philips Research Europe (2011): 1-50.*
Ilyas, Muhammad, et al. "Design of sTetro: A modular, reconfigurable, and autonomous staircase cleaning robot." Journal of Sensors 2018 (2018): 1-16.*
Verajagadheswa, Prabakaran, et al. "A novel autonomous staircase cleaning system with robust 3D-Deep Learning-based perception technique for Area-Coverage." Expert Systems with Applications 194 (2022): 116528.*
An abstract for Bangalore Gangadharaswamy, Lakshmi. Design of Autonomous Cleaning Robot. MS thesis. 2020.*
Notice of Allowance, dated Oct. 22, 2019, issued in Korean Patent Application No. KR 10-2018-0056132 (A) (5 pages).
PCT International Search Report, dated Sep. 10, 2019, issued in International Patent Application No. PCT/KR2019/005860 (4 pages).

* cited by examiner

CLEANER AND METHOD FOR CONTROLLING SAME

CROSS-REFERENCE TO RELATED APPLICATIONS

This application is the National Stage filing under 35 U.S.C. 371 of International Application No. PCT/KR2019/005860, filed on May 16, 2019, which claims the benefit of earlier filing date and right of priority to Korean Application No. 10-2018-0056132 filed on May 16, 2018, the contents of all of which are hereby incorporated by reference herein in their entirety.

TECHNICAL FIELD

The present disclosure relates to a cleaner and a method for controlling the same, and more particularly, to a cleaner capable of recognizing an obstacle and performing autonomous traveling, and a method for controlling the same.

BACKGROUND

In general, robots have been developed for industrial use and have been partially in charge of factory automation. In recent years, the field of application of robots has been expanded, and medical robots, aerospace robots, and the like have been developed, and household robots that can be used in ordinary homes have also been made.

A representative example of the home robot is a robot cleaner, which is a type of household appliance that suctions and cleans dust or foreign materials around the robot while autonomously traveling in a predetermined area. Such a robot cleaner is generally equipped with a rechargeable battery and an obstacle sensor for avoiding obstacles during traveling. Such structure allows the robot cleaner to perform cleaning while traveling by itself.

In recent years, research has been actively carried out to utilize the robot cleaner in various fields such as health care, smart home, remote control, and the like, instead of merely performing cleaning by autonomously traveling in a cleaning area.

Meanwhile, various types of obstacles may exist in the cleaning area of the robot cleaner, and the robot cleaner travels to pass or avoid such obstacles.

In general, an obstacle detection technology applied to a robot cleaner has been developed for the purpose of avoiding obstacles placed on the floor.

Therefore, the general robot cleaner has a problem in that it is difficult to avoid obstacles spaced apart from the floor.

For example, considering a structure of a bottom of a kitchen sink, a step may exist at a portion spaced a predetermined distance from the floor, and an obstacle that is present above the floor is generated due to the step.

That is, when the robot cleaner enters this structure, it determines that there is no obstacle on the floor, which makes it difficult to prevent a collision between a main body of the robot cleaner and the sink.

SUMMARY

Technical Problem

One aspect of the present disclosure is to provide an autonomous cleaner (or self-driving cleaner), capable of detecting an obstacle spaced apart from a floor of a cleaning area and avoiding the obstacle, and a method for controlling the same.

Another aspect of the present disclosure is to provide an autonomous cleaner, capable of reducing a cleaning time while effectively avoiding an obstacle floating above (spaced apart from) the floor, and a method for controlling the same.

Still another aspect of the present disclosure is to provide an autonomous cleaner, capable of increasing user's satisfaction by performing movement or traveling more naturally with respect to an obstacle floating above (spaced apart from) the floor, and a method for controlling the same.

Technical Solution

In order to achieve these and other advantages and in accordance with the purpose of this specification, as embodied and broadly described herein, there is provided a self-driving cleaner including a main body for driving in a cleaning area and suctioning a foreign material on a floor in the cleaning area, a driving unit for moving the main body within the cleaning area, a first pattern irradiation unit arranged on a front surface of the main body, for radiating light in a predetermined pattern towards a front lower side of the main body, a second pattern irradiation unit arranged on the front surface of the main body, for radiating light in a predetermined pattern towards a front upper side of the main body, a camera arranged on the front surface of the main body, for capturing, at a preset interval, an image comprising a first light pattern formed by the first pattern irradiation unit and a second light pattern formed by the second pattern irradiation unit, and a control unit for determining whether a first obstacle exists at a position upwardly spaced apart from the floor, by using the image captured by the camera.

In particular, the control unit may control the driving unit such that the main body moves along the first obstacle in a state where one side surface of the main body faces the first obstacle when it is determined that the first obstacle exists at a position spaced upward apart from the floor.

In one implementation, the control unit may detect the second light pattern from the image, and detect a distance between the first obstacle and the main body based on a shape of the detected second light pattern.

In one implementation, the control unit may control the driving unit to reduce a moving speed of the main body based on the distance between the first obstacle and the main body.

In one implementation, the control unit may control the driving unit such that the main body moves backward based on the distance between the first obstacle and the main body after the main body is stopped by the speed reduction control.

In one implementation, the control unit may control the driving unit such that the main body rotates by a predetermined angle when the distance between the first obstacle and the main body enters a preset distance range.

In one implementation, the control unit may stop the rotation of the main body when the one side surface of the main body faces the first obstacle, and control the driving unit such that the main body moves while the one side surface of the main body faces the first obstacle.

In one implementation, the control unit may set a shape of a second light pattern, detected from an image captured at a time when the rotation of the main body is completed, to a reference shape.

In one implementation, whenever an image is captured by the camera, the control unit may compare a second light pattern detected from the image with the reference shape, and control the driving unit based on a result of the comparison.

In one implementation, the control unit may control the driving unit such that the second light pattern corresponds to the reference shape.

In one implementation, the control unit may detect the first light pattern from the image and calculate a distance between a second obstacle placed on the floor and the main body based on a shape of the detected first light pattern.

In one implementation, the control unit may control the driving unit to maintain a distance between the main body and the second obstacle at a predetermined distance.

In one implementation, the control unit may control the driving unit to maintain the distance between the main body and the first obstacle, using at least one of the distance between the first obstacle and the main body and the distance between the second obstacle and the main body.

In one implementation, the control unit may monitor a change in the distance between the main body and the first obstacle, and select at least one of the distance between the first obstacle and the main body and the distance between the second obstacle and the main body as a reference of a travel control, based on a result of the monitoring.

In one implementation, the control unit may distinguish a first portion formed on the floor of the cleaning area and a second portion formed on the second obstacle in the first light pattern, and control the driving unit to maintain the distance between the main body and the first obstacle at a predetermined distance based on a length of the second portion.

Advantageous Effects

According to the present disclosure, a robot cleaner may perform precise driving in a corner area to clean the cleaning area thoroughly, thereby improving the performance of the cleaner.

In particular, according to the present disclosure, an uncleaned area in which cleaning cannot be performed by zigzag driving may be minimized, thereby improving user's satisfaction with the cleaner.

DETAILED DESCRIPTION

Hereinafter, description will be given in detail of implementations disclosed herein. Technical terms used in this specification are merely used for explaining specific implementations, and should not be constructed to limit the scope of the technology disclosed herein.

Figure 1:
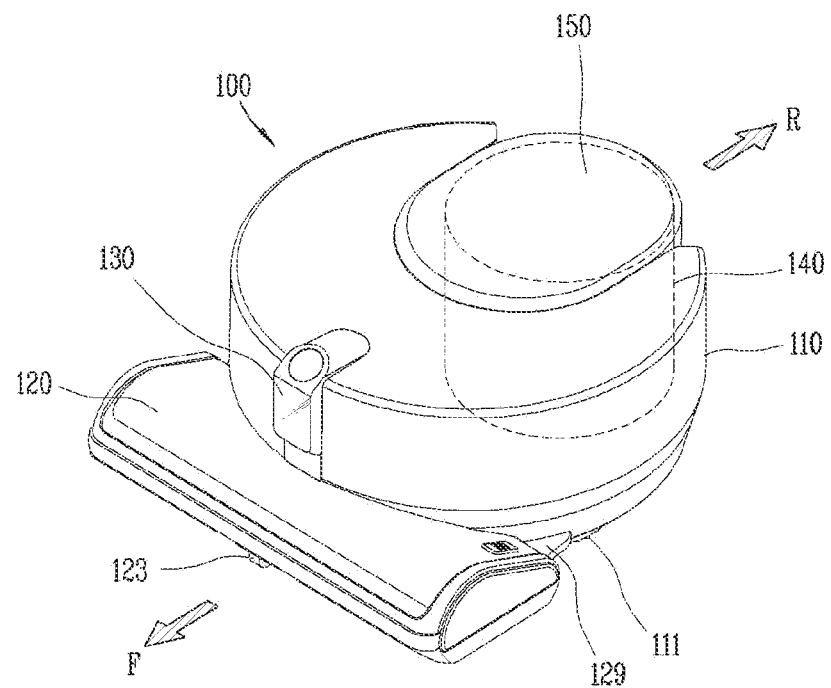
FIG. 1 is a perspective view illustrating an example of a cleaner that performs autonomous traveling according to the present disclosure.
Figure 2:
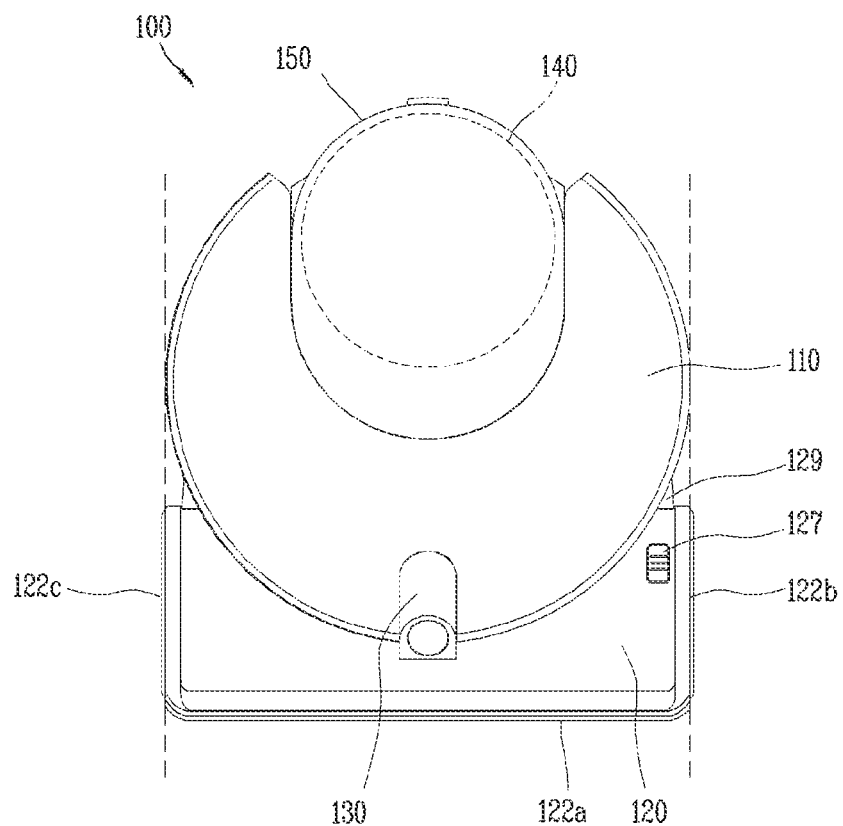
FIG. 2 is a planar view illustrating the cleaner that performs autonomous traveling illustrated in FIG. 1.
Figure 3:
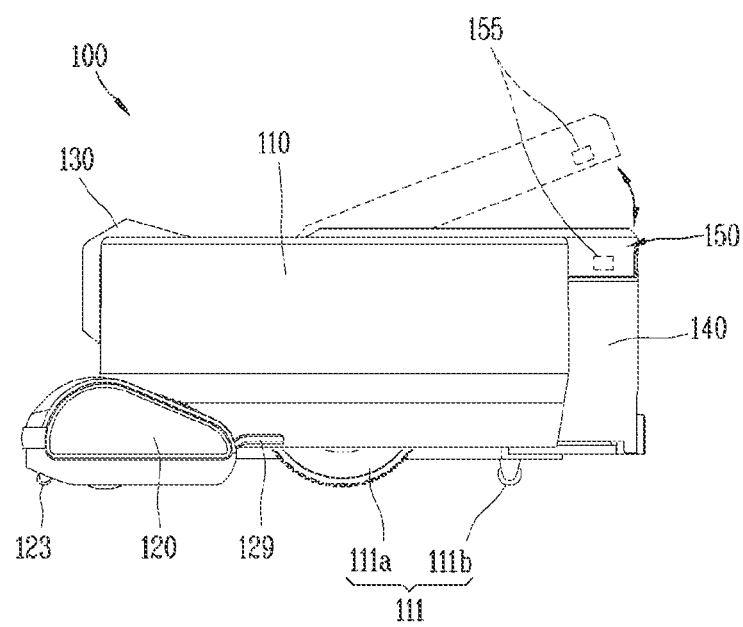
FIG. 3 is a lateral view illustrating the cleaner that performs autonomous traveling illustrated in FIG. 1.

FIG. 1 is a perspective view illustrating one implementation of a robot cleaner 100 according to the present disclosure, FIG. 2 is a planar view of the robot cleaner 100 illustrated in FIG. 1, and FIG. 3 is a lateral view of the robot cleaner 100 illustrated in FIG. 1.

For reference, in this specification, a mobile robot, a robot cleaner, and a cleaner that performs autonomous traveling may be used in the same sense.

Referring to FIGS. 1 to 3, a robot cleaner 100 performs a function of cleaning a floor while traveling on a predetermined area by itself. Cleaning of a floor mentioned here includes suctioning dust (including foreign matter) on the floor or mopping the floor.

The robot cleaner 100 includes a cleaner body 110, a suction unit 120, a sensing unit 130, and a dust container 140.

The cleaner body 110 is provided with a control unit (not shown) for the control of the robot cleaner 100 and a wheel unit 111 for the traveling of the robot cleaner 100. The robot cleaner 100 may move forward, backward, leftward and rightward by the wheel unit 111.

The wheel unit 111 includes main wheels 111a and a sub wheel 111b.

The main wheels 111a are provided on both sides of the cleaner body 110 and configured to be rotatable in one direction or another direction according to a control signal of the control unit. Each of the main wheels 111a may be configured to be driven independently of each other. For example, each main wheel 111a may be driven by a different motor.

The sub wheel 111b supports the cleaner main body 110 together with the main wheels 111a and assists the traveling of the robot cleaner 100 by the main wheels 111a. The sub wheel 111b may also be provided on a suction unit 120 to be described later.

As described above, the control unit is configured to control the traveling of the wheel unit 111 in such a manner that the robot cleaner 100 autonomously travels on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

The suction unit 120 is disposed to protrude from one side of the cleaner main body 110 so as to suction air containing dust. The one side may be a side on which the cleaner body 110 travels in a forward direction (F), that is, a front side of the cleaner body 110.

In the present drawing, it is shown that the suction unit 120 is protruded from one side of the cleaner body 110 to a front side and both left and right sides thereof. Specifically, a front end portion of the suction unit 120 is disposed at a position spaced forward apart from the one side of the cleaner main body 110, and left and right end portions of the suction unit 120 are disposed at positions spaced apart from the one side of the cleaner main body 110 in the right and left directions.

As the cleaner main body 110 is formed in a circular shape and both sides of a rear end portion of the suction unit 120 protrude from the cleaner main body 110 to both left and right sides, empty spaces, namely, gaps may be formed between the cleaner main body 110 and the suction unit 120. The empty spaces are spaces between both left and right end portions of the cleaner main body 110 and both left and right end portions of the suction unit 120 and each has a shape recessed into the robot cleaner 100.

If an obstacle is caught in the empty space, the robot cleaner 100 may be likely to be unmovable due to the obstacle. In order to prevent this, a cover member 129 may be disposed to cover at least part of the vacant space. The cover member 129 may be provided on the cleaner main body 110 or the suction unit 120. In this implementation of the present disclosure, the cover member 129 protrudes from each of both sides of the rear end portion of the suction unit 120 and covers an outer circumferential surface of the cleaner main body 110.

The cover member 129 is disposed to fill at least part of the empty space, that is, the empty space between the cleaner main body 110 and the suction unit 120. Therefore, it may be possible to implement a structure capable of preventing an obstacle from being caught in the vacant space, or being easily released from the obstacle even when the obstacle is caught in the vacant space.

The cover member 129 protruding from the suction unit 120 may be supported on the outer circumferential surface of the cleaner main body 110. The cover member 129 may be supported on a rear portion of the suction unit 120 if the cover member 129 protrudes from the cleaner main body 110. According to this structure, when the suction unit 120 is impacted due to colliding with an obstacle, a part of the impact is transferred to the cleaner main body 110 so as to be dispersed.

The suction unit 120 may be detachably coupled to the cleaner main body 110. When the suction unit 120 is detached from the cleaner main body 110, a mop module (not shown) may be detachably coupled to the cleaner main body 110 in place of the detached suction unit 120. Accordingly, the user can mount the suction unit 120 on the cleaner main body 110 when the user wishes to remove dust on the floor, and may mount the mop module on the cleaner main body 110 when the user wants to mop the floor.

When the suction unit 120 is mounted on the cleaner main body 110, the mounting may be guided by the cover member 129 described above. That is, as the cover member 129 is disposed to cover the outer circumferential surface of the cleaner main body 110, a relative position of the suction unit 120 with respect to the cleaner main body 110 may be determined.

A sensing unit 130 is disposed in the cleaner body 110. As illustrated, the sensing unit 130 may be disposed on one side of the cleaner main body 110 where the suction unit 120 is located, that is, on a front side of the cleaner main body 110.

The sensing unit 130 may be disposed to overlap the suction unit 120 in an up and down direction of the cleaner main body 110. The sensing unit 130 is disposed at an upper portion of the suction unit 120 so as to detect an obstacle or feature in front of the robot so that the suction unit 120 positioned at the forefront of the robot cleaner 100 does not hit the obstacle.

The sensing unit 130 is configured to additionally perform another sensing function in addition to the sensing function. This will be described in detail later.

The cleaner main body 110 is provided with a dust container accommodating portion. The dust container 140 in which dust separated from the suctioned air is collected is detachably coupled to the dust container accommodating portion. As illustrated in the drawing, the dust container accommodation portion 113 may be formed on the other side of the cleaner body 110, namely, behind the cleaner body 110.

A part of the dust container 140 is accommodated in the dust container accommodation portion 113 and another part of the dust container 140 is formed to protrude toward a rear side of the cleaner body 110 (i.e., a reverse direction (R) opposite to a forward direction (F)).

The dust container 140 is formed with an inlet 140a through which air containing dust is introduced and an outlet 140b through which air separated from dust is discharged, and when the dust container 140 is installed in the dust container accommodation portion 113, the inlet 140a and the outlet 140b are configured to communicate with a first opening 110a and a second opening 110b formed in an inner wall of the dust container accommodation portion 113, respectively.

The intake passage in the cleaner body 110 corresponds to a passage from the inlet port (not shown) communicating with the communicating portion 120b to the first opening 110a, and the discharge passage corresponds to a passage from the second opening 110b to the discharge port 112.

According to such connection, air containing dust introduced through the suction unit 120 flows into the dust container 140 through the intake passage inside the cleaner main body 110 and the air is separated from the dust while passing through a filter and cyclone of the dust container 140. Dust is collected in the dust container 140, and air is discharged from the dust container 140 and then discharged to the outside through the discharge port 112 in the cleaner body 110 and finally through the discharge port 112.

Hereinafter, an implementation related to the components of the robot cleaner 100 will be described with reference to FIG. 4.

A robot cleaner 100 or a mobile robot according to an implementation of the present disclosure may include at least one of a communication unit 1100, an input unit 1200, a driving unit 1300, a sensing unit 1400, an output unit 1500, a power supply unit 1600, a memory 1700, and a control unit 1800, or a combination thereof.

Figure 4:
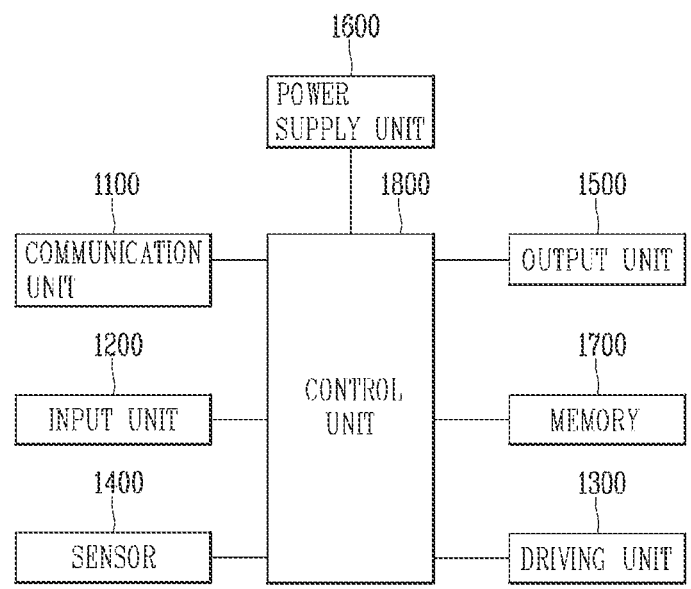
FIG. 4 is a block view illustrating components of a cleaner performing autonomous traveling in accordance with one implementation of the present disclosure.

Here, it is needless to say that the components shown in FIG. 4 are not essential, and thus a robot cleaner having more or fewer components than shown in FIG. 4 may be implemented. Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to travel or perform a specific function.

Here, the control unit 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing portion so that a remaining power level and a charging state can be transmitted to the control unit 1800. The output unit 1500 may display the remaining battery level on a screen under the control of the control unit.

The battery may be located in a bottom portion of a center of the robot cleaner, or may be located in either the left or right side. In the latter case, the mobile robot may further include a balance weight for eliminating a weight bias of the battery.

On the other hand, the driving unit 1300 may include a motor, and operate the motor to bidirectionally rotate left and right main wheels, so that the main body can rotate or move. The driving unit 1300 may allow the main body of the mobile robot to move forward, backward, leftward and rightward, travel in a curved manner or rotate in place.

On the other hand, the input unit 1200 receives various control commands for the robot cleaner from the user. The input unit 1200 may include one or more buttons, for example, the input unit 1200 may include an OK button, a set button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base, and the like.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, the installation position and installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output a warning sound to the outside in accordance with a warning signal generated by the control unit 1800.

Here, the sound output device may be a device for outputting sound such as a beeper, a speaker, or the like, and the output unit 1500 may output the sound to the outside through the sound output device using audio data or message data having a predetermined pattern stored in the memory 1700.

Accordingly, the mobile robot according to one implementation of the present disclosure can output environmental information related to a travel area through the output unit 1500 or output the same in an audible manner. According to another implementation, the mobile robot may transmit map information or environmental information to a terminal device through the communication unit 1100 so that the terminal device outputs a screen to be output through the output unit 1500 or sounds.

On the other hand, the communication unit 1100 is connected to the terminal device and/or another device (mixed with term "home appliance" in this specification) located in a specific area in one of wired, wireless, satellite communication methods to transmit and receive signals and data.

The communication unit 1100 may transmit and receive data with another located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

The memory 1700 stores a control program for controlling or driving the robot cleaner and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an impact sensor, an external signal detection sensor, a front detection sensor, a cliff detection sensor, a lower camera sensor, an upper camera sensor and a three-dimensional camera sensor.

The impact sensor may be provided at at least one point on an outer surface of the main body, and may sense a physical force applied to the point.

In one example, the impact sensor may be disposed on the outer surface of the main body to be directed toward the front of the main body. In another example, the impact sensor may be disposed on the outer surface of the body to be directed to the rear of the body. In another example, the impact sensor may be disposed on the outer surface of the main body to be directed toward the left or right side of the main body.

The external signal sensor or external signal detection sensor may sense an external signal of the mobile robot. The external signal detection sensor may be, for example, an infrared ray sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Furthermore, the control unit 1800 may compare ultrasonic waves emitted from the transmitter and ultrasonic waves received at the receiver to detect information related to a size of the obstacle. For example, the control unit 1800 may determine that the obstacle is larger in size when more ultrasonic waves are received in the receiver.

In one implementation, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The infrared sensor may also sense an obstacle existing at the front or the side to transmit obstacle information to the control unit 1800. In other words, the infrared sensor may sense a protrusion, a household appliance, a furniture, a wall surface, a wall corner, and the like, on the moving path of the mobile robot to transmit the information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For an example, any one of the cliff detection sensors may be installed in front of the mobile robot, and the other two cliff detection sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared angle between an emission signal of infrared rays emitted from the cliff detection sensor toward the ground and a reflection signal reflected and received by the obstacle to sense a cliff and analyze the depth thereof.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the lower camera sensor is provided on the rear surface of the mobile robot, and acquires image information regarding the lower side, that is, the bottom surface (or the surface to be cleaned) during the movement. The lower camera sensor is also referred to as an optical flow sensor in other words. The lower camera sensor converts a lower image input from an image sensor provided in the sensor to generate image data of a predetermined format. The generated image data may be stored in the memory 1700.

Also, at least one light source may be installed adjacent to the image sensor. The one or more light sources irradiate light to a predetermined region of the bottom surface captured by the image sensor. That is, while the mobile robot moves in a specific area along the floor surface, a constant distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the lower camera sensor. The control unit 1800 may compare and analyze image data captured by the lower camera sensor according to time to calculate a moving distance and a moving direction, and calculate a position of the mobile robot based on the calculated moving distance and moving direction. By using the image information regarding the lower side of the mobile robot captured by the lower camera sensor, the control unit 1800 may perform correction that is robust against slippage with respect to the position of the mobile robot calculated by another element.

On the other hand, the upper camera sensor may be installed so as to face upward or forward of the mobile robot to photograph the surroundings of the mobile robot. When the mobile robot includes a plurality of upper camera sensors, the camera sensors may be disposed on the upper or side surface of the mobile robot at predetermined distances or at predetermined angles.

The three-dimensional camera sensor may be attached to one side or a part of the main body of the mobile robot to generate three-dimensional coordinate information related to the surroundings of the main body.

That is, the 3D camera sensor may be a 3D depth camera that calculates a remote/near distance between the mobile robot and an object to be captured.

Specifically, the 3D camera sensor may capture 2D images related to surroundings of the main body, and generate a plurality of 3D coordinate information corresponding to the captured 2D images.

In one implementation, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the implementation may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another implementation, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

In the following FIG. 5, an implementation showing an installation aspect of a cleaner 100 and a charging station 510 in a cleaning area will be described.

Figure 5:
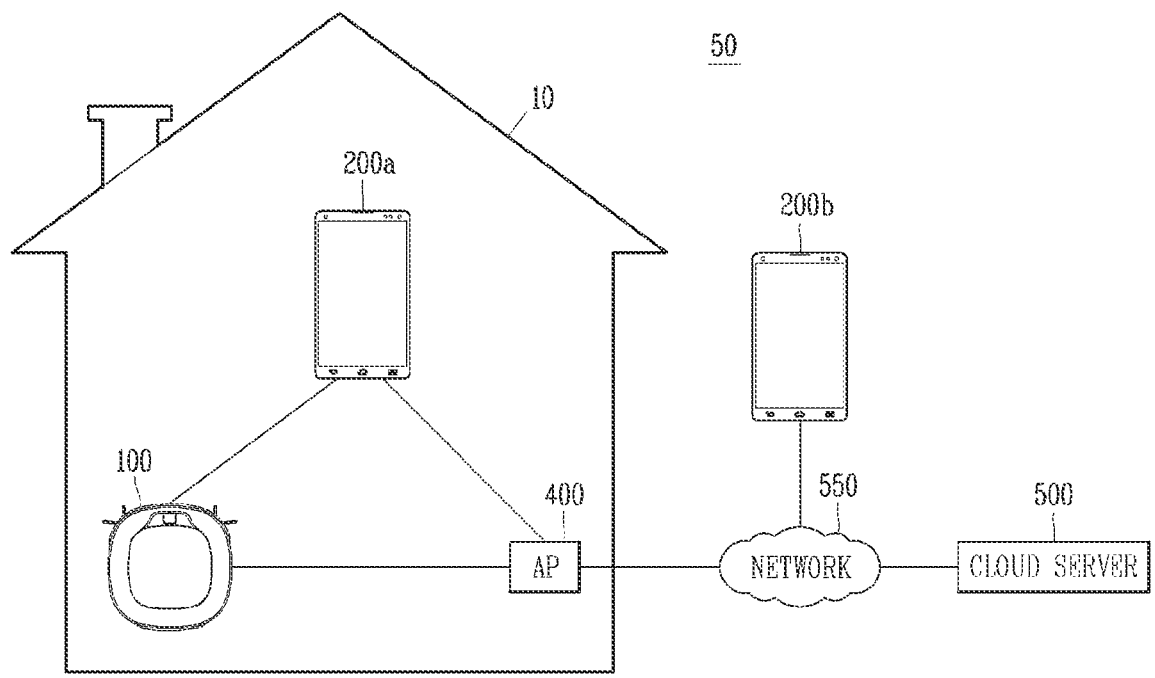
FIG. 5 is a conceptual view illustrating an example in which a cleaner and a charging station according to the present disclosure are installed in a cleaning area.

As shown in FIG. 5, the charging station 510 for charging a battery of the cleaner 100 may be installed in a cleaning area 500. In one implementation, the charging station 510 may be installed at an outer edge of the cleaning area 500.

Although not shown in FIG. 5, the charging station 510 may include a communication device (not shown) capable of emitting different types of signals, and the communication device may perform wireless communication with the communication unit 1100 of the cleaner 100.

The control unit 1800 may control the driving unit 1300 such that the main body of the cleaner 100 is docked to the charging station 510 based on a signal received at the communication unit 1100 from the charging station 510.

The control unit 1800 may move the main body in a direction of the charging station 510 when a remaining capacity of the battery falls below a limit capacity, and control the driving unit 1300 to start a docking function when the main body is close to the charging station 510.

Figure 6:
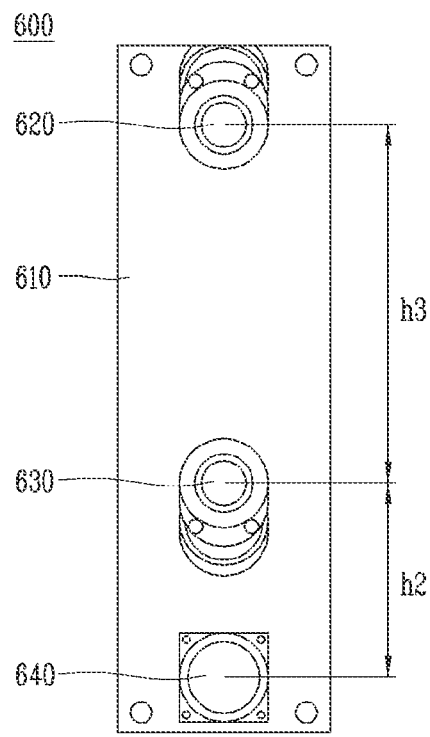
FIGS. 6 and 7 are front and lateral views of an obstacle detection unit.
Figure 7:
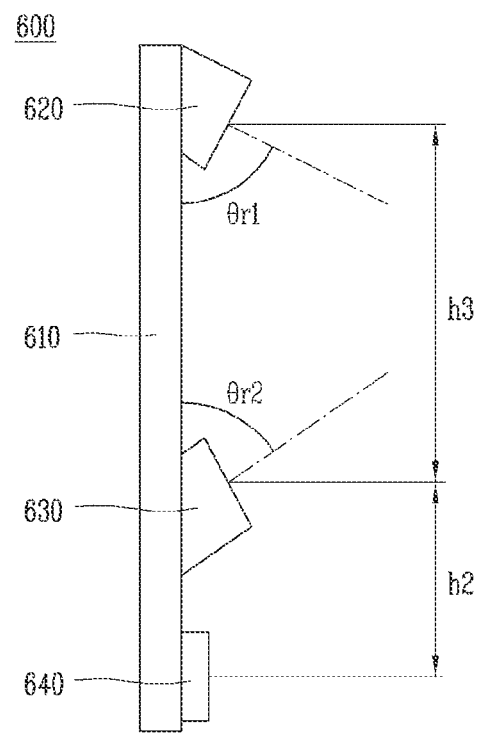
Figure 8:
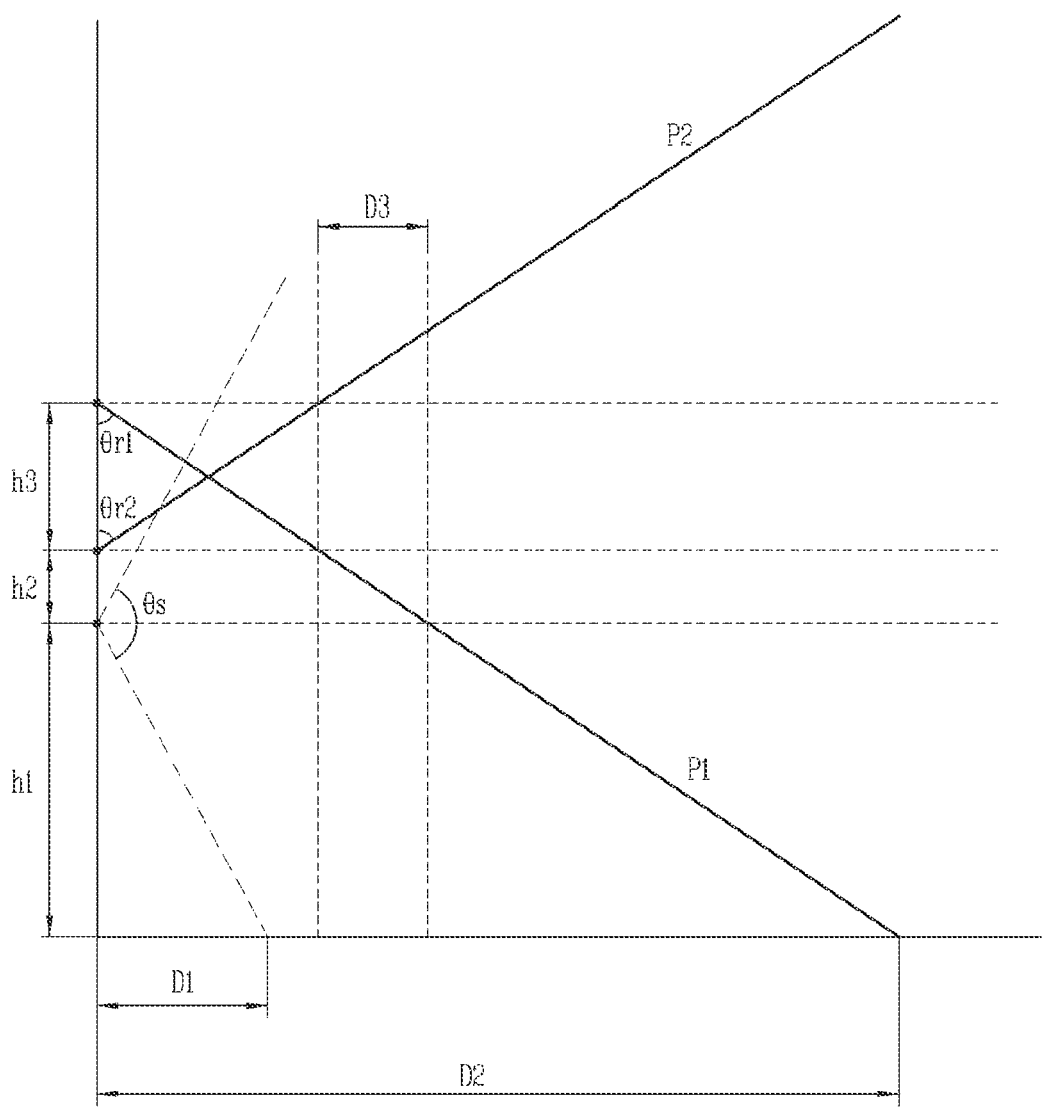
FIG. 8 is a diagram illustrating an irradiation range and an obstacle detection range of the obstacle detection unit.

FIG. 6 is a front view of an obstacle detection unit, and FIG. 7 is a later view of the obstacle detection unit. FIG. 8 illustrates an irradiation range and an obstacle detection range of the obstacle detection unit.

As illustrated in FIG. 6, each of first and second pattern irradiation units 120 and 130 of an obstacle detection unit 100 may include a light source and a pattern generator (i.e., an optical pattern projection element (OPPE)) through which light irradiated from the light source is transmitted to generate a predetermined pattern. The light source may be a laser diode (LD), a light emitting diode (LED), or the like. Laser light is superior to other light sources in terms of monochromaticity, straightness, and connection characteristic, and allows precise distance measurement. In particular, infrared or visible light causes great deviation in accuracy of distance measurement depending on factors such as color and material of an object. Therefore, the laser diode is preferable as the light source. The pattern generator may include a diffractive optical element (DOE). Various patterns of light may be irradiated according to the configuration of the pattern generator provided in each of the pattern irradiation units 120 and 130.

The first pattern irradiation unit 120 may irradiate a first pattern of light (hereinafter, referred to as first pattern light) P1 toward a front lower side of a main body 10. Accordingly, the first pattern light P1 may be incident on the floor of the cleaning area.

The first pattern light P1 may be formed in the shape of a horizontal line Ph. In addition, the first pattern light P1 may be formed in the shape of a cross pattern in which the horizontal line Ph and a vertical line Pv intersect with each other.

The first pattern irradiation unit 120, the second pattern irradiation unit 130, and an image acquisition unit 140 may be vertically arranged in a row. The image acquisition unit 140 may be disposed below the first pattern irradiation unit 120 and the second pattern irradiation unit 130, but the present disclosure may not be limited thereto. The image acquisition unit may alternatively be disposed above the first pattern irradiation unit and the second pattern irradiation unit.

In an implementation, the first pattern irradiation unit 120 may be located at a top to irradiate the first pattern light P1 toward the front lower side, so as to detect an object located below it. The second pattern irradiation unit 130 may be located below the first pattern irradiation unit 120 to irradiate a second pattern of light (hereinafter, referred to as second pattern light) P2 toward the front upper side. Accordingly, the second pattern light P2 may be incident on an obstacle or a specific portion of the obstacle that is located higher than at least the second pattern irradiation unit 130 from a wall or the floor of the cleaning area.

The second pattern light P2 may be a different pattern from the first pattern light P1, and preferably include a horizontal line. Here, the horizontal line does not necessarily have to be a continuous line segment, but may be a dotted line.

An irradiation angle θh indicates a horizontal irradiation angle of the first pattern light P1 irradiated from the first pattern irradiation unit 120. The irradiation angle indicates an angle that both ends of the horizontal line Ph form with the first pattern irradiation unit 120 and is preferably set in the range of 130° to 140°. However, the present disclosure may not be necessarily limited thereto.

Like the first pattern irradiation unit 120, the horizontal irradiation angle of the second pattern irradiation unit 130 may preferably be set in the range of 130° to 140°. Depending on implementations, the second pattern irradiation unit 130 may irradiate the second pattern light P2 at the same horizontal irradiation angle as that of the first pattern irradiation unit 120.

The image acquisition unit 140 may acquire an image of the front of the main body 10. In particular, the pattern lights P1 and P2 appear in images acquired by the image acquisition unit 140 (hereinafter, referred to as acquired images). Hereinafter, images of the pattern lights P1 and P2 appearing in the acquired images are referred to as light patterns. Since the light patterns are substantially images that the pattern lights P1 and P2 incident on a real space are projected on an image sensor, the same reference numerals as the pattern lights P1 and P2 are given to the light patterns. Thus, the images corresponding to the first pattern light P1 and the second pattern light P2 are referred to as a first light pattern P1 and a second light pattern P2.

The image acquisition unit 140 may include a digital camera that converts an image of a subject to be captured into an electrical signal and then converts it into a digital signal to store in a memory device. The digital camera may include an image sensor (not shown) and an image processing unit (not shown).

An image sensor may be an apparatus for converting an optical image into an electrical signal. The image sensor may be configured as a chip on which a plurality of photo diodes is integrated, and the photo diode may be a pixel, for example. Electric charges are accumulated in the respective pixels by an image, which is formed on the chip by light passing through a lens, and the electric charges accumulated in the pixels are converted into an electrical signal (for example, voltage). Charge Coupled Device (CCD), Complementary Metal Oxide Semiconductor (CMOS), and the like are well known as image sensors.

The image processing unit may generate a digital image based on an analog signal output from the image sensor. The image processing unit may include an AD converter for converting an analog signal into a digital signal, a buffer memory for temporarily recording digital data according to the digital signal output from the AD converter, and a digital signal processor (DSP) for creating a digital image by processing information recorded in the buffer memory.

The control unit may detect features such as points, lines, and planes for predetermined pixels constituting an acquired image, and detect the light pattern P1, P2 or points, lines, and planes constituting the light pattern P1, P2 based on the detected features.

For example, the control unit may extract line segments that are constructed by consecutive pixels brighter than surroundings, and extract a horizontal line Ph constituting the first light pattern P1 and a horizontal line constituting the second light pattern P2.

However, the present disclosure may not be limited thereto. Since various techniques for extracting patterns of desired shapes from digital images are already known, the control unit may alternatively extract the first light pattern P1 and the second light pattern P2 using those already-known techniques.

As illustrated in FIG. 8, the first pattern irradiation unit 120 and the second pattern irradiation unit 130 may be symmetrically disposed The first pattern irradiation unit 120 and the second pattern irradiation unit 130 may be disposed vertically apart by a distance h3. Accordingly, the first pattern irradiation unit may irradiate the first pattern light downward, and the second pattern irradiation unit may irradiate the second pattern light upward, so that the pattern lights intersect with each other.

The image acquisition unit 140 may be located below the second pattern irradiation unit by a distance h2 and capture the front images of the main body 10 at a viewing angle θs in the vertical direction. The image acquisition unit 140 may be installed at a distance hi from the floor. The image acquisition unit 140 may preferably be installed at position where it does not interfere with capturing the front, considering a bumper (not shown) constructing a lower end of the front portion of the main body 10 of the mobile robot 1 or a shape of a structure for traveling or cleaning.

The first pattern irradiation unit 120 or the second pattern irradiation unit 130 may be installed such that a direction in which an optical axis of a lens constituting the first or second pattern irradiation unit 120 or 130 is directed forms a predetermined irradiation angle.

The first pattern irradiation unit 120 may irradiate the first pattern light P1 downward at a first irradiation angle θr1 and the second pattern irradiation unit 130 may irradiate the second pattern light P2 at a second irradiation angle θr2. In this case, the first irradiation angle and the second irradiation angle may basically be different from each other, but may alternatively be set to be the same in some cases. The first and second irradiation angles may preferably be determined in the range of 50° to 75°, but may not be necessarily limited thereto. For example, the first irradiation angle may be set to 60° to 70° and the second irradiation angle may be set to 50° to 55°. The irradiation angles may vary depending on the structure of a lower bumper of the mobile robot, a detected distance from a lower object, or a height of an upper part to be detected.

When the pattern light irradiated from the first pattern irradiation unit 120 and/or the second pattern irradiation unit 130 is incident on an obstacle, the position of the light pattern P1, P2 may differ in an acquired image depending on a distance by which the obstacle is spaced apart from the first pattern irradiation unit 120. For example, in case where the first pattern light P1 and the second pattern light P2 are incident on a predetermined obstacle, the first light pattern P1 in an acquired image may be displayed at a higher position while the second light pattern P2 in the acquired image may be displayed at a lower position when the obstacle is located close to the mobile robot 1. That is, distance data to an obstacle that corresponds to a row constituting an image generated by the image acquisition unit 140 (i.e., a line including pixels arranged in a horizontal direction) may be stored in advance. When the light patterns P1 and P2 detected in the image acquired by the image acquisition unit 140 are detected in a predetermined row, the position of the obstacle may be estimated from distance data to the obstacle corresponding to the row.

The image acquisition unit 140 may be aligned so that an optical axis of the lens is directed in a horizontal direction. θs illustrated in FIG. 8 denotes a viewing angle of the image acquisition unit 140 and may be set to a value of 100° or greater, preferably, 100° to 110°, but is not necessarily limited thereto.

In addition, a distance from the floor of the cleaning area to the image acquisition unit 140 may be determined approximately between 60 mm to 70 mm. In this case, the floor of the cleaning area in the image acquired by the image acquisition unit 140 may appear after D1 from the image acquisition unit. D2 denotes a position at which the first light pattern P1 is displayed on the floor appearing in the acquired image. In this case, when an obstacle is located at D2, an image in which the first pattern light P1 is incident on the obstacle may be obtained by the image acquisition unit 140. When the obstacle is closer to the mobile robot than D2, the first light pattern may be displayed above a reference position ref1 in response to the incident first pattern light P1.

Here, the distance from the main body 10 to D1 may preferably be in the range of 100 mm to 150 mm, and the distance from the main body 10 to D2 may preferably be in the range of 180 mm to 280 mm, but the present disclosure may not be limited thereto. On the other hand, D3 denotes a distance from the most protruding portion of the front of the main body to a position on which the second pattern light is incident. Since the main body detects an obstacle while moving, D3 is a minimum distance for detecting an obstacle located at the front (upper part) without colliding with the obstacle. D3 may be set to approximately 23 mm to 30 mm.

On the other hand, an obstacle information acquisition unit 220 may determine that there is a cliff near the mobile robot 1 when the first light pattern P1 present in an acquired image disappears in a normal state or the first light pattern is partially displayed while the main body 10 moves.

When the first light pattern is not displayed in the acquired image, the obstacle information acquisition unit 220 may recognize a cliff positioned in front of the mobile robot 1. When a cliff (for example, a staircase) exists in front of the mobile robot 1, since the first pattern light is not incident on the floor, the first light pattern P1 may disappear from the acquired image.

Based on the length of D2, the obstacle information acquisition unit 220 may determine that there is a cliff at D2 ahead of the main body 10. In this case, when the first pattern light P1 has a cross shape, a horizontal line may disappear and only a vertical line may be displayed. According to this, the obstacle information acquisition unit 220 may determine the presence of the cliff.

Further, when a part of the first light pattern is not displayed, the obstacle information acquisition unit 220 may determine that a cliff exists on the left or right side of the mobile robot 1. When a right part of the first light pattern is not displayed, it may be determined that a cliff exists on the right.

Accordingly, the control unit may control the driving unit 1300, based on information related to the cliff recognized by the obstacle information acquisition unit 220, so that the mobile robot 1 travels along a path to avoid the cliff.

In addition, when there is a cliff in front of the mobile robot, the control unit 1800 may control the mobile robot to move forward by a predetermine distance, for example, D2 or less, to redetermine whether there is a cliff by using the cliff sensor disposed on the lower portion of the main body. The mobile robot 1 may firstly check the presence of the cliff through the acquired image, and secondly check the presence of the cliff using the cliff sensor by moving ahead by a predetermined distance.

FIGS. 9A to 9E are views illustrating the pattern light irradiated by the first pattern irradiation unit.

The control unit may detect a first light pattern or a second light pattern from an acquired image input from the image acquisition unit 140 and analyze the first light pattern or the second light pattern detected from the acquired image. In particular, the control unit may determine whether there is an obstacle by comparing the position of the first light pattern with a predetermined reference position ref1.

Figure 9A:
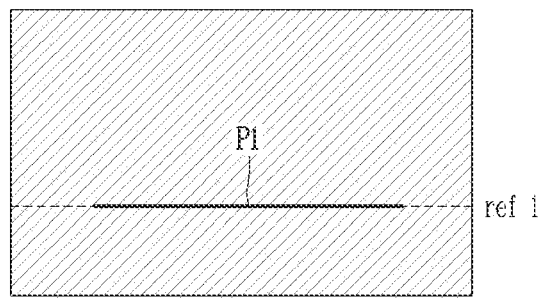
FIGS. 9A to 9E are views illustrating a pattern of light irradiated by a first pattern irradiation unit.

As illustrated in FIG. 9A, when the horizontal line of the first light pattern P1 is located at the reference position ref1 it may be determined as a normal state. Here, the normal state may be a state in which the mobile robot can continuously travel because the floor is level, even and flat and any obstacle is not present at the front.

Since the second light pattern P2 is incident on an obstacle and appears in an acquired image when the obstacle is present above the front, it is general that the second light pattern P2 does not appear in the normal state.

Figure 9B:
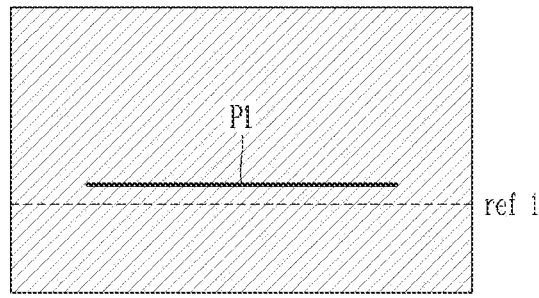

As illustrated in FIG. 9B, when the horizontal line of the first light pattern P1 is located above the reference position ref1, the control unit 1800 may determine that an obstacle exists at the front.

When the obstacle is detected, the control unit 1800 may control the driving unit 1300 such that the mobile robot travels while avoiding the obstacle. Meanwhile, the control unit 1800 may determine position and size of the detected obstacle, in response to determination of the positions of the first and second light patterns P1 and P2 and display or non-display of the second light pattern. In addition, the control unit 1800 may determine the position and size of the obstacle, in response to changes in the first and second light patterns displayed in the acquired image while traveling.

The control unit 1800 may determine whether to keep traveling along the detected obstacle or to travel by avoiding the obstacle based on information related to the detected obstacle, and control the driving unit 1300 based on the determination result. For example, the control unit 1800 may determine that the mobile robot can keep traveling when a height of the obstacle is lower than a predetermined height or the mobile robot enters a space between the obstacle and the floor.

Figure 9C:
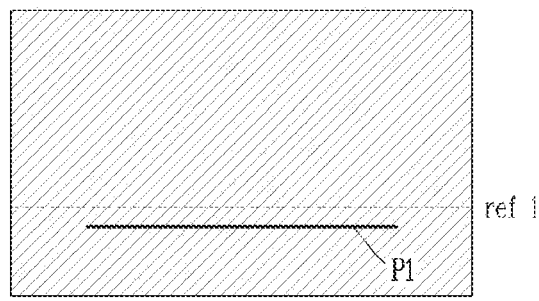

As illustrated in FIG. 9C, the first light pattern P1 may be displayed at a position lower than the reference position ref1. When the first light pattern P1 appears at the position lower than the reference position, the control unit 1800 may determine that a downhill exists. The downhill may be distinguished from a cliff because the first light pattern P1 disappears when the cliff exists.

Figure 9D:
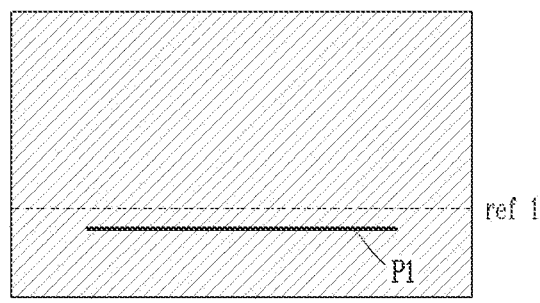

As illustrated in FIG. 9D, when the first light pattern is not displayed, the control unit 1800 may determine that a cliff exists in the traveling direction.

Figure 9E:
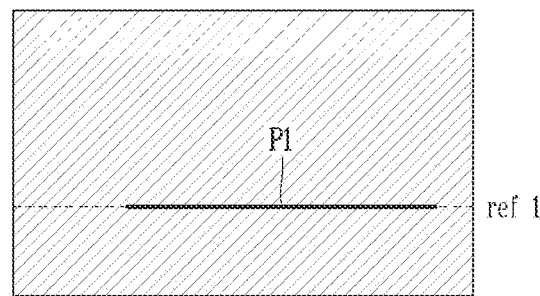

In addition, as illustrated in FIG. 9E, when a part of the first light pattern is not displayed, the obstacle information acquisition unit 220 may determine that a cliff exists on the left or right. In this case, the obstacle information acquisition unit 220 may determine that a cliff exists on the left side of the main body 10.

On the other hand, when the first light pattern P1 has a cross shape, the control unit 1800 may determine whether there is an obstacle by considering both the position of the horizontal line and the length of the vertical line.

Hereinafter, description will be given of an implementation in which the first and second pattern irradiation units of the cleaner 100 proposed in the present disclosure irradiate light to the lower and upper sides of the cleaner, with reference to FIG. 10.

Figure 10:
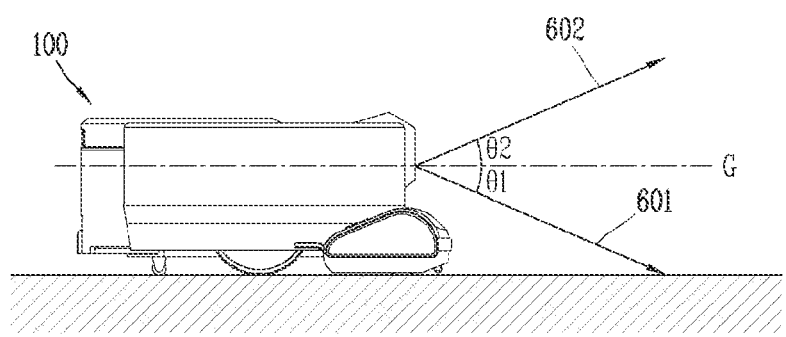
FIG. 10 is a conceptual view illustrating one implementation of a cleaner irradiating light.

As illustrated in FIG. 10, the first pattern irradiation unit 620 may irradiate a first light 601 toward the floor, and the second pattern irradiation unit 630 may irradiate a second light 602 toward the upper side of the main body.

Referring to FIG. 10, the first light 601 may form a first angle θ1 with a predetermined plane G in parallel to the floor, and the second light 602 may form a second angle θ2 with the plane G.

The first angle θ1 and the second angle θ2 may be different from each other. In one example, the first angle θ1 may be set to be smaller than the second angle θ2.

Hereinafter, a method by which the cleaner proposed in the present disclosure detects an obstacle will be described, with reference to FIG. 11.

Figure 11:
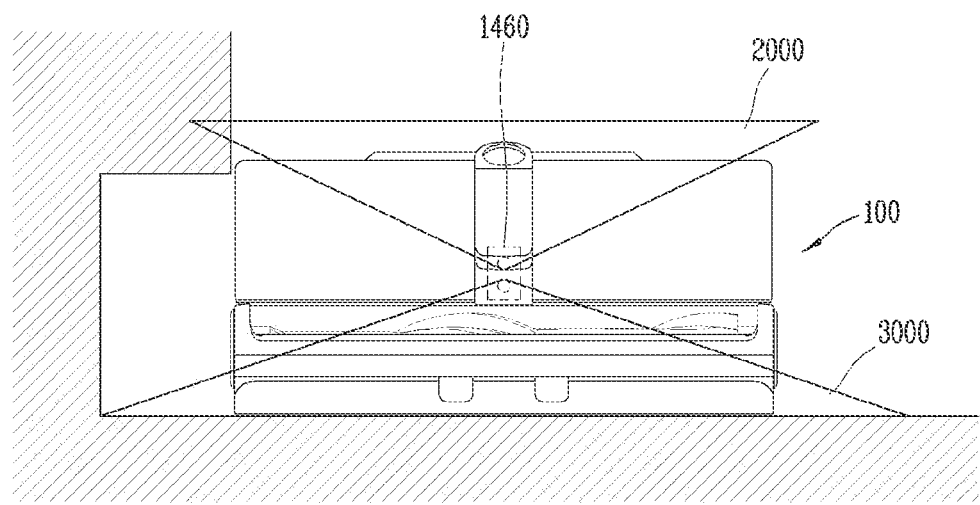
FIG. 11 is a conceptual view illustrating an implementation in which an autonomous cleaner (or self-driving cleaner) according to the present disclosure irradiates light with respect to an obstacle having a step formed at a predetermined height from a floor.

As illustrated in FIG. 11, the first pattern irradiation unit 610 of the cleaner 100 may irradiate a first laser 3000 toward the floor, and the second pattern irradiation unit 620 may irradiate a second laser 2000 toward the ceiling.

Referring to FIG. 11, since an obstacle has a step at a predetermined height, the cleaner 100 cannot detect the obstacle using the first laser 3000 but can detect the obstacle using the second laser 2000.

In FIGS. 12 to 15, one surface, which is connected to (in contact with) the floor, of an obstacle having a step as illustrated in FIG. 6, is defined as a second obstacle W_L. In addition, another surface of the obstacle protruding from the one surface connected to the floor is defined as a first obstacle W_H.

Figure 12:
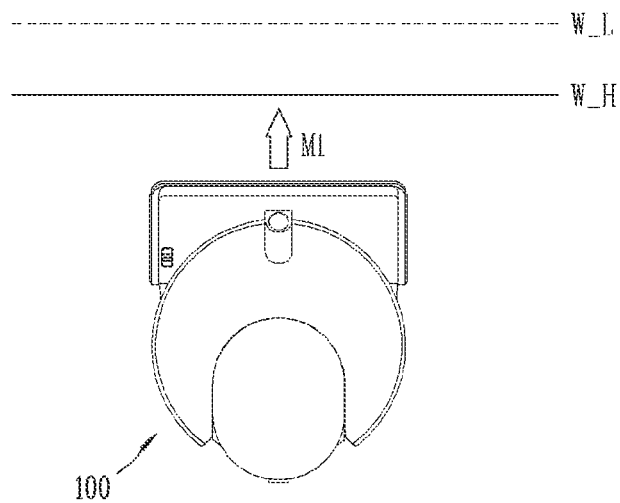
FIG. 12 is a conceptual view illustrating a method in which an autonomous cleaner proposed in the present disclosure travels with respect to an obstacle floating above (spaced apart from) a floor.

Referring to FIG. 12, while traveling along a preset pattern in the cleaning area, the cleaner 100 may detect that an obstacle spaced apart from the floor exists in front of the main body. That is, while traveling along the preset pattern in the cleaning area, the cleaner 100 may perform a first movement (first travel) M1 for detecting the obstacle.

Specifically, when the second laser 2000 irradiated upward is captured by the image acquisition unit 640, the control unit 1800 of the cleaner 100 may determine whether an obstacle spaced upward apart from the floor exists in front of the main body by using the second light pattern displayed in the captured image.

In addition, when it is determined that the obstacle exists in a position spaced upward apart from the floor, the control unit 1800 may control the driving unit 1300 such that the main body moves along the first obstacle while one side surface of the main body faces the obstacle.

In one example, when the second light pattern is first detected in the captured image, the control unit 1800 may determine that the first obstacle spaced upward apart from the floor exists at a predetermined distance from the front of the main body.

In another example, the control unit 1800 may detect the second light pattern from the image and detect a distance between the first obstacle WH and the main body based on a shape of the detected second light pattern.

Figure 13:
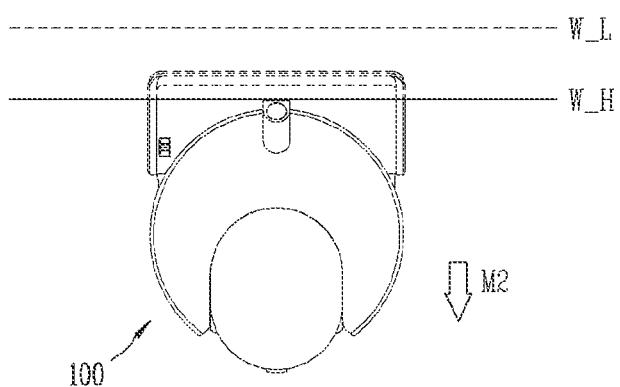
FIG. 13 is a conceptual view illustrating a method in which an autonomous cleaner proposed in the present disclosure travels with respect to an obstacle floating above a floor.

Next, referring to FIG. 13, the control unit 1800 may control the driving unit 1300 so that the distance between the first obstacle W_H and the main body becomes shorter than or equal to a preset reference distance.

In an example, the control unit 1800 may control the driving unit 1300 to decrease a moving speed of the main body based on the distance between the first obstacle W_H and the main body.

In another example, when the distance between the first obstacle W_H and the main body becomes shorter than or equal to the preset reference distance, the control unit 1800 may control the driving unit 1300 to stop the main body.

Meanwhile, the reference distance may be set to detect a distance between the second obstacle W_L and the main body.

When the distance between the first obstacle W_H and the main body becomes shorter than or equal to a predetermined distance, the control unit 1800 may control the driving unit 1300 so that the main body moves backward from the first obstacle by a predetermined distance.

Specifically, the cleaner 100 may perform deceleration control after detecting the first obstacle, thereby stopping in front of the first obstacle W_H. Thereafter, the control unit

1800 may perform a second movement M2 for moving the main body backward from the first obstacle.

Figure 14:
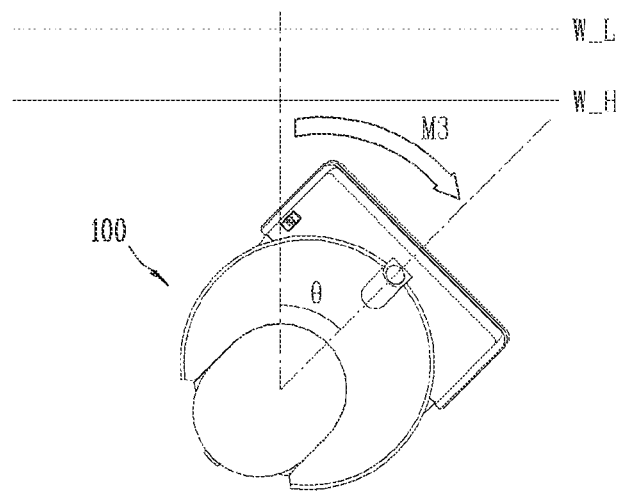
FIG. 14 is a conceptual view illustrating a method in which an autonomous cleaner proposed in the present disclosure travels with respect to an obstacle floating above a floor.

Referring to FIG. 14, the control unit 1800 may perform a third movement M3 for rotating the main body such that one side surface of the main body faces the first obstacle.

In one example, the control unit 1800 may control the driving unit 1300 so that the main body is rotated by 90 degrees after completion of the second movement M2 for moving the main body backward.

In another example, the control unit 1800 may omit the second movement M2 and perform a third movement M3 for rotating the main body based on the distance between the main body and the first obstacle.

That is, when the distance between the first obstacle and the main body enters a preset distance range, the control unit 1800 may control the driving unit so that the main body is rotated by a predetermined angle.

Figure 15:
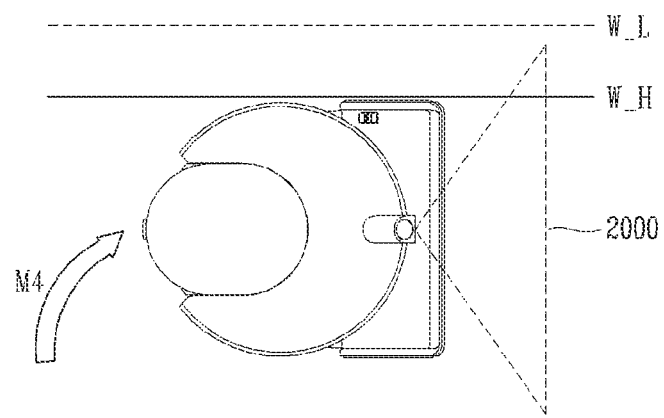
FIG. 15 is a conceptual view illustrating a method in which an autonomous cleaner proposed in the present disclosure travels with respect to an obstacle floating above a floor.

Referring to FIG. 15, the control unit 1800 may stop the rotation of the main body when the one side surface of the main body faces the first obstacle, and perform a fourth movement M4 for controlling the driving unit 1300 so that the main body moves while the one side surface faces the first obstacle.

That is, the control unit 1800 may detect an outer surface formed by the first obstacle W_H as a wall, and perform a following movement to move along the first obstacle W_H.

In one implementation, the control unit 1800 may set the shape of the second light pattern, which is detected from an image captured at the time when the third movement M3 for rotating the main body is completed, as a reference shape.

That is, the control unit 1800 may detect the shape of the second light pattern from an image captured at the time when the one side surface of the main body first faces the first obstacle, set the detected shape as a reference shape, and then compare the second light pattern, which is detected from an image newly captured while the main body moves along the first obstacle, with the reference shape.

In other words, whenever the camera captures an image, the control unit 1800 may compare the second light pattern detected from the image with the reference shape, and control the driving unit 1300 based on the comparison result.

In one example, when the second light pattern is larger than the reference shape, the control unit 1800 may control the driving unit 1300 so that the main body is spaced farther apart from the first obstacle.

In another example, when a portion of the second light pattern formed on the first obstacle is larger than a portion of the reference shape corresponding to the first obstacle, the control unit 1800 may control the driving unit 1300 so that the main body is spaced farther apart from the first obstacle.

In another example, the control unit 1800 may control the driving unit 1300 to change a steering direction of the cleaner 100 based on a direction to which a line segment, formed on the first obstacle, of the second light pattern, is directed.

As in the aforementioned example, the control unit 1800 may control the driving unit 1300 so that the second light pattern corresponds to the reference shape. That is, the control unit 1800 may control the driving unit 1300 to maintain the initially detected shape of the second light pattern.

Meanwhile, the control unit 1800 may detect the first light pattern from an image and calculate a distance between the second obstacle W_L placed on the floor and the main body based on the shape of the detected first light pattern.

Also, the control unit 1800 may control the driving unit 1300 so that the distance between the main body and the second obstacle W_L is maintained at a predetermined distance.

That is, the control unit 1800 may control the driving unit 1300 so that the main body moves along the first obstacle, by using at least one of a distance between the first obstacle W_H and the main body and a distance between the second obstacle W_L and the main body.

Compared with the second light pattern, since the first light pattern is detected with a relatively high frequency, the accuracy of the obstacle detection may be enhanced by using the first light pattern even in the process of detecting an obstacle spaced apart from the floor.

That is, when the cleaner 100 initially enters an obstacle having a step, the control unit 1800 may calculate a distance between the main body and the second obstacle W_L using the first light pattern 601, and calculate a distance between the main body and the first obstacle W_H using the second light pattern 602.

In this way, the control unit 1800 may calculate the distances to the first and second obstacles, respectively, and control the driving unit 1300 to maintain the distance between the body and the first obstacle.

In this case, the control unit 1800 may preferentially use the distance between the body and the first obstacle W_H calculated using the second light pattern 602, in order to control the steering direction of the cleaner 100.

In addition, the control unit 1800 may monitor a change in the distance between the main body and the first obstacle, and select at least one of the distance between the first obstacle and the main body and the distance between the second obstacle and the second obstacle as a reference of a travel (movement) control, based on the monitoring result.

That is, when the first light pattern changes rapidly, reliability of the first light pattern may decrease. Thus, the control unit 1800 may control a steering angle of the main body using the second light pattern instead of the first light pattern.

In an embodiment, the control unit 1800 may distinguish a first portion formed on the floor of the cleaning area and a second portion formed on the second obstacle in the first light pattern. In this case, the control unit 1800 may control the driving unit 1300 to maintain a distance between the main body and the first obstacle at a predetermined distance based on a length of the second portion.

Figure 16:
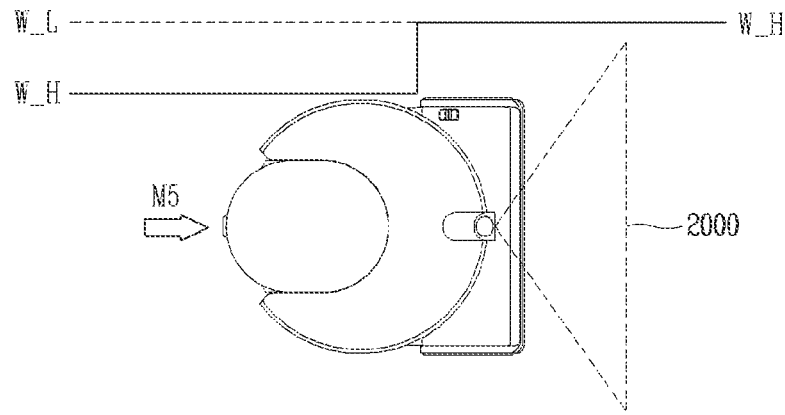
FIG. 16 is a conceptual view illustrating a method in which an autonomous cleaner proposed in the present disclosure travels with respect to an obstacle floating above a floor.

Referring to FIG. 16, the control unit 1800 may perform a fifth movement (M5) for moving the main body until the first obstacle is not detected any more.

Alternatively, the control unit 1800 may determine that a detected obstacle is a wall without a step when the distance between the main body and the second obstacle W_L calculated using the first light pattern 601 corresponds to the distance between the body and the first obstacle W_H calculated using the second light pattern 602.

Figure 17:
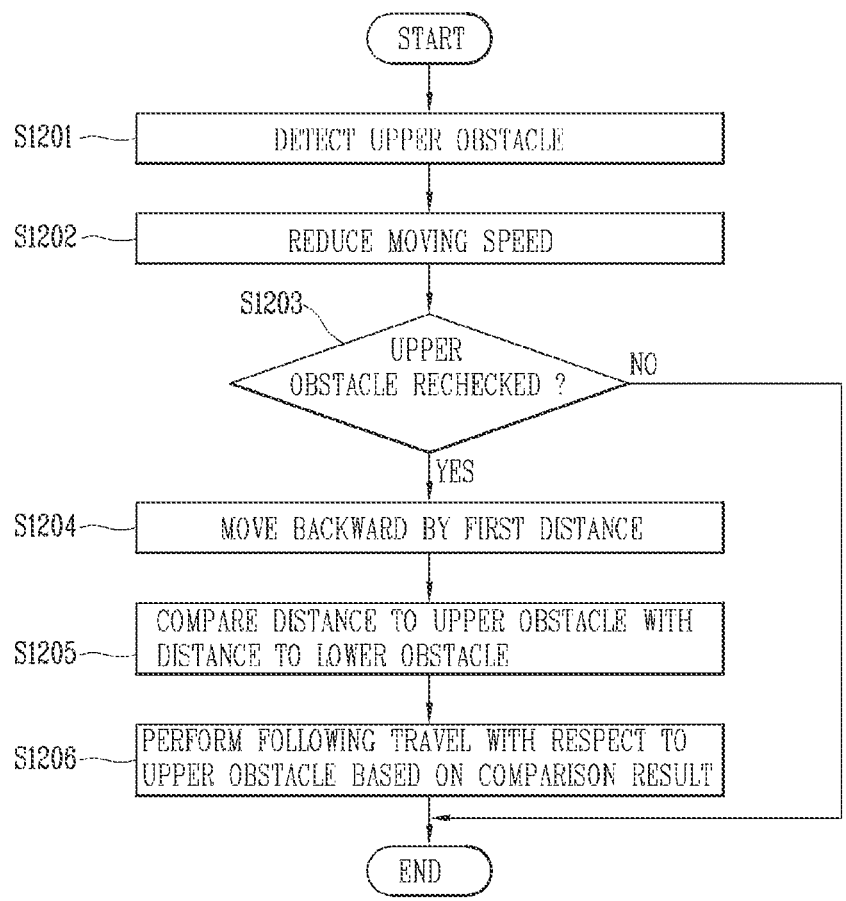
FIG. 17 is a flowchart illustrating a method for controlling an autonomous cleaner proposed in the present disclosure.

Referring to FIG. 17, the control unit 1800 may detect an upper obstacle using light patterns detected from an image (S1201). Here, the upper obstacle indicates an obstacle spaced apart from the floor.

When it is determined that the upper obstacle exists in front of the main body, the control unit 1800 may reduce a moving speed of the main body (S1202).

When the speed reduction control (S1202) is completed, the control unit 1800 may recheck information related to the upper obstacle (S1203). Specifically, after the speed reduction control is completed, the control unit 1800 may verify whether the upper obstacle exists by comparing a first light pattern and a second light pattern.

The control unit 1800 may then control the main body to move backward by a first distance (S1204).

Thereafter, the control unit 1800 may compare a distance to the upper obstacle with a distance to a lower obstacle (S1205).

Also, the control unit 1800 may perform following traveling with respect to the upper obstacle based on the comparison result (S1206). Specifically, the control unit 1800 may control the main body to move so that the distance between the upper and lower obstacles is maintained.

According to the present disclosure, a robot cleaner may perform precise driving in a corner area to clean the cleaning area thoroughly, thereby improving the performance of the cleaner.

In particular, according to the present disclosure, an uncleaned area in which cleaning cannot be performed by zigzag driving may be minimized, thereby improving user's satisfaction with the cleaner.

What is claimed is:

1. A self-driving cleaner comprising:
    a main body for driving in a cleaning area and suctioning a foreign material on a floor in the cleaning area;
    a driving unit for moving the main body within the cleaning area;
    a first pattern irradiation unit arranged on a front surface of the main body, for radiating light in a predetermined pattern towards a front lower side of the main body;
    a second pattern irradiation unit arranged on the front surface of the main body, for radiating light in a predetermined pattern towards a front upper side of the main body;
    a camera arranged on the front surface of the main body, for capturing, at a preset interval, an image comprising a first light pattern formed by the first pattern irradiation unit and a second light pattern formed by the second pattern irradiation unit; and
    a control unit for determining whether a first obstacle exists at a position upwardly spaced apart from the floor, by using the image captured by the camera,
    wherein the control unit distinguishes the first obstacle and a second obstacle placed on the floor,
    wherein the first obstacle is one surface protruding from one side connected to the floor of an obstacle having a step,
    wherein the second obstacle is the one side,
    wherein the control unit controls the driving unit such that the main body moves along the first obstacle in a state where one side surface of the main body faces the first obstacle when it is determined that the first obstacle exists,
    wherein the control unit:
        detects the second light pattern from the image, and detects a distance between the first obstacle and the main body based on a shape of the detected second light pattern,
        controls the driving unit such that the main body moves backward from the first obstacle based on the distance between the first obstacle and the main body,
        controls the driving unit such that the main body rotates by a predetermined angle when the distance between the first obstacle and the main body enters a preset distance range, and
        stops the rotation of the main body when the one side surface of the main body faces the first obstacle, and controls the driving unit such that the main body moves while the one side surface of the main body faces the first obstacle.

2. The cleaner of claim 1, wherein the control unit detects the first light pattern from the image and calculates a distance between the second obstacle and the main body based on a shape of the detected first light pattern.

3. The cleaner of claim 1, wherein the control unit controls the driving unit to reduce a moving speed of the main body based on the distance between the first obstacle and the main body.

4. The cleaner of claim 3, wherein the control unit controls the driving unit such that the main body moves backward after the main body is stopped by the speed reduction control.

5. The cleaner of claim 2, wherein the control unit controls the driving unit to maintain a distance between the main body and the second obstacle at a predetermined distance.

6. The cleaner of claim 2, wherein the control unit controls the driving unit to maintain the distance between the main body and the first obstacle, using at least one of the distance between the first obstacle and the main body and the distance between the second obstacle and the main body.

7. The cleaner of claim 4, wherein the control unit sets a shape of a second light pattern, detected from an image captured at a time when the rotation of the main body is completed, to a reference shape.

8. The cleaner of claim 7, wherein the control unit, whenever an image is captured by the camera, compares a second light pattern detected from the image with the reference shape, and controls the driving unit based on a result of the comparison.

9. The cleaner of claim 8, wherein the control unit controls the driving unit such that the second light pattern corresponds to the reference shape.

10. The cleaner of claim 6, wherein the control unit monitors a change in the distance between the main body and the first obstacle, and
    selects at least one of the distance between the first obstacle and the main body and the distance between the second obstacle and the main body as a reference of a travel control, based on a result of the monitoring.

11. The cleaner of claim 2, wherein the control unit distinguishes a first portion formed on the floor of the cleaning area and a second portion formed on the second obstacle in the first light pattern, and
    controls the driving unit to maintain the distance between the main body and the first obstacle at a predetermined distance based on a length of the second portion.

* * * * *